US007089460B2

(12) United States Patent
Fu

(10) Patent No.: US 7,089,460 B2
(45) Date of Patent: Aug. 8, 2006

(54) SYSTEM AND METHOD FOR MEMORY LEAK DETECTION

(75) Inventor: John Fu, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 10/377,975

(22) Filed: Feb. 28, 2003

(65) Prior Publication Data

US 2004/0172579 A1    Sep. 2, 2004

(51) Int. Cl.
*G06F 11/00* (2006.01)
(52) U.S. Cl. .............................. 714/47; 714/42; 714/25; 707/206
(58) Field of Classification Search ................ 707/206
See application file for complete search history.

(56) References Cited

U.S. PATENT DOCUMENTS

| 6,182,022 | B1 * | 1/2001 | Mayle et al. ............... 702/182 |
| 6,370,684 | B1 | 4/2002 | De Pauw et al. |
| 6,810,495 | B1 * | 10/2004 | Castelli et al. ................ 714/47 |
| 6,832,236 | B1 * | 12/2004 | Hamilton et al. ........... 718/100 |
| 6,892,378 | B1 * | 5/2005 | Curtis et al. ................ 717/127 |
| 6,898,602 | B1 * | 5/2005 | Sayag ........................ 707/206 |
| 2004/0078540 | A1 * | 4/2004 | Cirne et al. ................. 711/170 |
| 2005/0076184 | A1 * | 4/2005 | Schumacher ................ 711/170 |
| 2005/0204342 | A1 * | 9/2005 | Broussard ................... 717/124 |
| 2005/0268286 | A1 * | 12/2005 | Obata et al. ................ 717/124 |

OTHER PUBLICATIONS

Patrick M. Sansom, Simon L. Peyton Jones, Generational garbage collection for Haskell, Proceedings of the conference on Functional programming languages and computer architecture, p. 106-116, Jun. 9-11, 1993, Copenhagen, Denmark.*
Agarwal, S., "Simple Memory Leak Detection," *windows developer magazine*, Feb. 2002, pp. 37-38.
Arnold, T.R., and W.A. Fuson, "In a Perfect World," *Communications of the ACM* 37(9):78-86, Sep. 1994.

(Continued)

*Primary Examiner*—Bryce P. Bonzo
*Assistant Examiner*—Jack W. Szeto
(74) *Attorney, Agent, or Firm*—Christensen O'Connor Johnson Kindness PLLC

(57) ABSTRACT

The present invention is directed to detecting leaks in computer memory. Memory leaks are detected by analyzing computer component memory usage records. The first derivative of the memory usage data is computed. If the area under a curve created by a plot of the first derivative of the memory usage data is greater than zero, the second derivative of the memory usage data is computed. If the area under a curve created by a plot of the second derivative of the memory usage data also is greater than or equal to zero, the memory usage data is analyzed to determine how many minima points are present in the memory usage data. If less than four memory usage data minima points are present, a memory leak exists. If four or more minima points are present in the memory usage data, the minima points are further processed to determine if a memory leak exists.

54 Claims, 17 Drawing Sheets

OTHER PUBLICATIONS

Hicks, Morrisett, Grossman, and Jim, Safe and Flexible Memory Management in Cyclone. Uni. Maryland Technical Report CS-TR-4514, Jul. 2003.*

De Pauw, W., and G. Sevitsky, "Visualizing Reference Patterns for Solving Memory Leaks in Java," *Proceedings of 13th European Conference of Object-Oriented Programming (ECOOP '99)*, Lisbon, Portugal, Jun. 1999, pp. 116-134.

Hastings, R., and B. Joyce, "Purify: Fast Detection of Memory Leaks and Access Errors," *USENIX*, Winter 1992, pp. 125-136.

Ishaq, J., "Palm OS Memory Leak Detection," *Dr. Dobb's Journal*, Jul. 2001, pp. 62-70.

Scholz, B., et al., "Symbolic Pointer Analysis for Detecting Memory Leaks," *ACM SIGPLAN Notices* 34(11):1-10, Nov. 1999.

* cited by examiner

SYSTEM AND METHOD FOR MEMORY LEAK DETECTION

FIELD OF THE INVENTION

The present invention generally relates to resource usage diagnostics in computer systems and more specifically to detecting memory leaks in such systems.

BACKGROUND OF THE INVENTION

In recent years, worldwide use of computing devices has increased dramatically. Computer application programs ("applications") on running computing devices are used for a variety of purposes, including word processing, accounting, database management, desktop publishing, communications and the like. In addition to application programs, computing devices also have software known as an operating system that controls the operation of the computing device and the various applications and other programs that execute on the computing device. A myriad of different applications, programs, and operating systems may be used on a computing device.

Applications, programs, and operating systems and their component parts (processes, threads, jobs, and the like) consume the memory resources of a computing device. Memory resources, when reserved for the use of a particular program or one of its components, are generally referred to as allocated memory. When a program no longer needs the memory it has been allocated, the allocated memory is supposed to be deallocated, thereby allowing other programs to use the memory. However, deallocation does not always occur. A program's improper failure to deallocate memory is commonly referred to as a memory leak. Memory leaks are difficult to detect because programs operate in complex computing environments that hide the symptoms of a memory leak. Memory leaks often go undetected until all memory resources are consumed or some detectable error caused by a memory leak occurs. It is unfeasible to constantly examine all aspects of a computing device's memory to try to locate allocated memory that is no longer being used. The complexity of current computing environments, and the autonomy of programs and their components, makes such an examination unfeasible. Accordingly, there is a need for a method of detecting memory leaks in computing environments that does not require examining all aspects of a computer's memory. Additionally, there is a need for such a memory leak detection method that does not adversely interfere with the processing and operation of programs on a computing device.

Some previous memory detection methods have involved tracking memory usage and utilizing a low-pass filter to determine if a memory leak is present. The major disadvantage of using only a low-pass filter to examine memory usage data for programs in a computing environment has been a high rate of false positive indications of memory leaks, i.e., an indication of a memory leak where in fact no memory leak is present. Accordingly, there is also a need for a method of detecting memory leaks using memory usage data that does not produce to a high rate of false positive indications of memory leaks.

SUMMARY OF THE INVENTION

The present invention is directed to detecting memory leaks in computing environments. In accordance with one aspect of the invention, memory leaks are detected by analyzing records of memory usage by programs, processes, jobs, threads and other memory utilizing components. More specifically, memory leaks are detected by obtaining memory usage data for a memory using component and computing a first derivative of the memory usage data. If the first derivative of the memory usage data has an "area under a curve", which may be determined by summing its elements, that is greater than zero, the usage data is further analyzed. The further analysis involves computing a second derivative of the memory usage data and determining if the second derivative also has an "area under a curve" of greater than or equal to zero. If the second derivative has an "area under a curve" that is greater than or equal to zero, the memory usage data is processed to determine how many minima points are present in the memory usage data. If less than four minima points are present, the presence of a memory leak is indicated.

In an alternate embodiment of the present invention, more than four minima points may required, so as to provide an even more accurate computation of minima points. Those of ordinary skill in the art and others will appreciate that this alternate embodiment is still within the spirit and scope of the present invention.

In accordance with other aspects of this invention, if four or more minima points are present in the memory usage data, further processing is performed to determine if there is a memory leak. First, a calculation of a first derivative of the memory usage data elements that correspond to the minima points is made. If the first derivative of the memory usage data elements that correspond to the minima points has an area under a curve greater than zero, the second derivative of the memory usage data elements that correspond to the minima points is calculated. If the second derivative of the memory usage data elements that correspond to the minima points has an area under a curve greater than or equal to zero, the presence of a memory leak is indicated. If either the first or second derivative of the memory usage data elements that correspond to the minima points are zero or less, no memory leak is indicated.

As will be readily appreciated by those skilled in the art and others from the foregoing summary, the invention efficiently analyzes memory usage data to detect memory leaks. The invention accomplishes this result without producing an excessive amount of false positive indications.

In accordance with further aspects of the present invention, the memory usage data analysis is performed iteratively on a plurality of memory components.

In accordance with other aspects of the present invention, memory leaks are prioritized by the severity of the memory leak. The severity of a memory leak can be determined by the size of the area under the curve of the second derivative of the memory usage data. For example, the larger the size of the area under the curve of the second derivative, the more severe the memory leak.

In accordance with yet further aspects of the present invention, the memory usage data is enhanced by reducing the impact of old elements included in the memory usage data. Reducing the impact of old elements, in one exemplary aspect, comprises filtering old memory usage data elements as one technique for enhancing memory usage data. Averaging old memory usage data elements with neighbors is one technique for is one form of low pass filtering.

In accordance with yet still further aspects of the present invention, only portions of the memory usage data elements beyond a threshold time are enhanced.

In accordance with still yet other aspects of the present invention, memory usage data elements that are older than a predetermined time are entirely discarded.

As will be readily appreciated from the foregoing summary, the invention provides a new and improved method, system and computer readable medium for detecting leaks in computer memory.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description which follows is represented largely in terms of processes and symbolic representations of the operation of conventional computer components, including a processor, memory storage devices for the processor, connected display devices, and input devices. These processes and operations may utilize conventional computer components in a heterogeneous distributed computer environment, including remote file servers, computer servers, and memory storage devices. Each of these conventional distributing competing components is accessible by the processor via a communication network.

Figure 1:
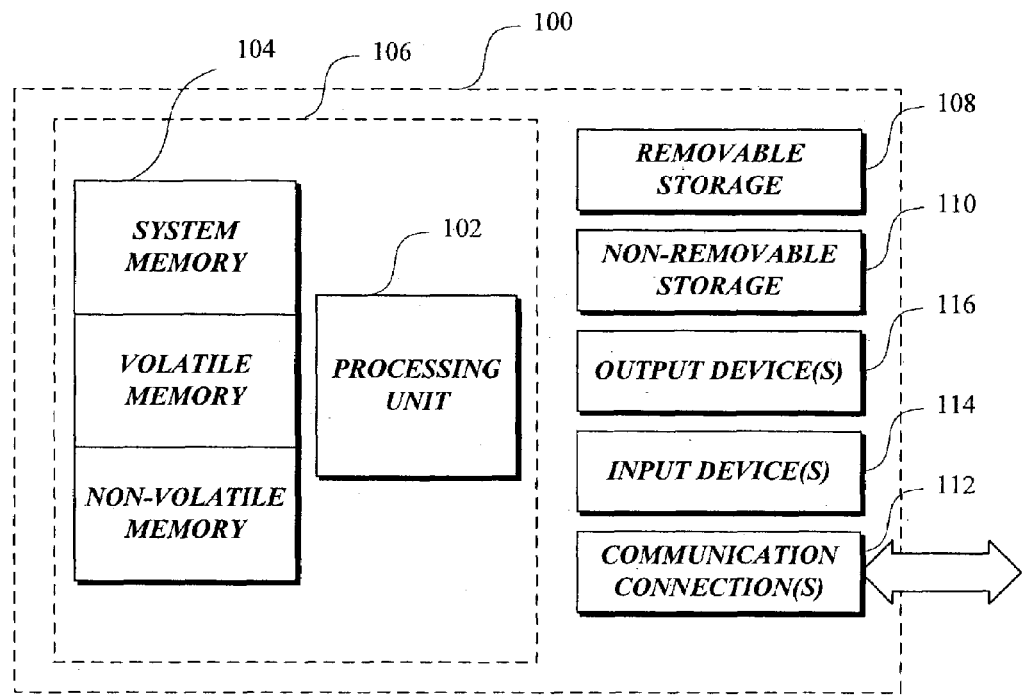
FIG. 1 is a block diagram of a computing device that includes a memory.

FIG. 1 illustrates an example of a computing system suitable for detecting memory leaks in accordance with the present invention. The computing system is only an example of a suitable computing environment and is not intended to suggest any limitation as to the scope of use or functionality of the invention. Neither should the computing environment be interpreted as having any dependency requirement relating to any one or a combination of components included in the exemplary operating environment.

The invention is operational in numerous other general purpose or special computing system environments or configurations. Examples of well known computing systems, environments and/or configurations that may be suitable for implementing the invention include, but are not limited to, personal computers, server computers, laptop devices, handheld computers, tablet computers, multiprocessor systems, microprocessor-based systems, network PC's, mini-computers, mainframe computers and distributed computing environments that include any combination of the above systems or components.

FIG. 1 illustrates an exemplary computing device 100 suitable for implementing the invention. In its most basic configuration, the computing device 100, illustrated in FIG. 1 by dashed line 106, typically includes at least one processing unit 102 and memory 104. Depending on the exact configuration and type of client device, memory 104 may be volatile (such as RAM), non-volatile (such as ROM, flash memory, etc.) or some combination of the two. Computing device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and non-volatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory, or other memory technology, CD-ROM, digital versatile disks ("DVD"), or other optical storage, magnetic cassettes, magnetic tape, magnetic disk storage, or other magnetic storage devices, or any other medium which can be used to store the desired information and which can be accessed by computing device 100. Any such computer storage media may be part of computing device 100.

Computing device 100 may also contain communications connection(s) 112 that allow the computing device 100 to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection and wireless media such as acoustic, RF, infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. Since all these devices are well known in the art they are not described here.

Figure 2:
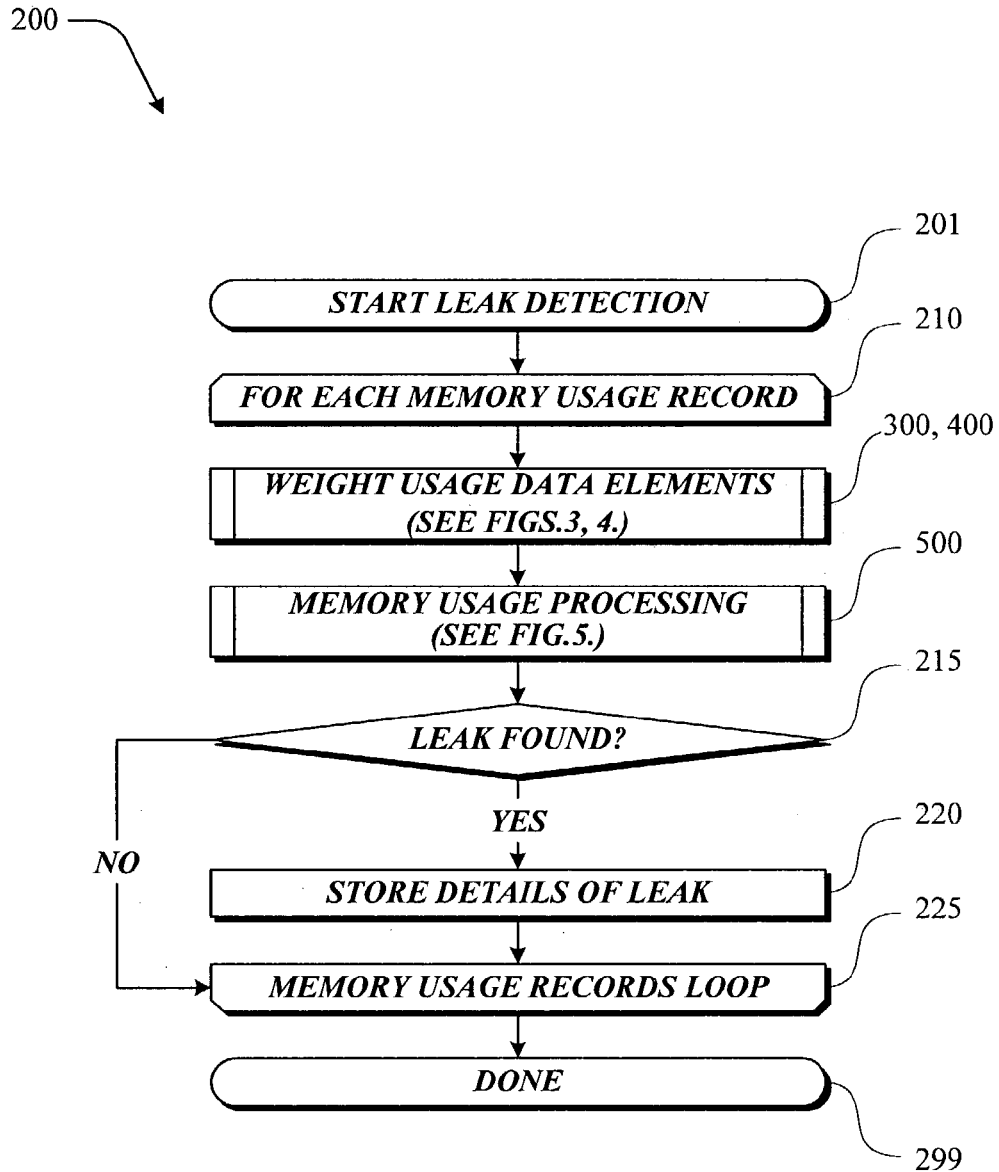
FIG. 2 is a functional flow diagram illustrating a leak detection routine implemented by a computing device to detect memory leaks formed in accordance with the present invention.

FIG. 2 is a functional flow diagram illustrating processing performed by a leak detection routine 200 formed in accordance with the invention by a computing device. As will be better understood from the following description, the leak detection routine 200 is used to check logged memory usage data to determine if particular software components are leaking memory. Memory usage data is gathered using any suitable logging method. Since memory usage data logging methods are well known, no specific method is described here. In general, memory usage data is gathered at intervals that are frequent enough to capture memory allocations and deallocations by software components executing on the computing device implementing the invention and is sequentially ordered by time.

Figure 14:
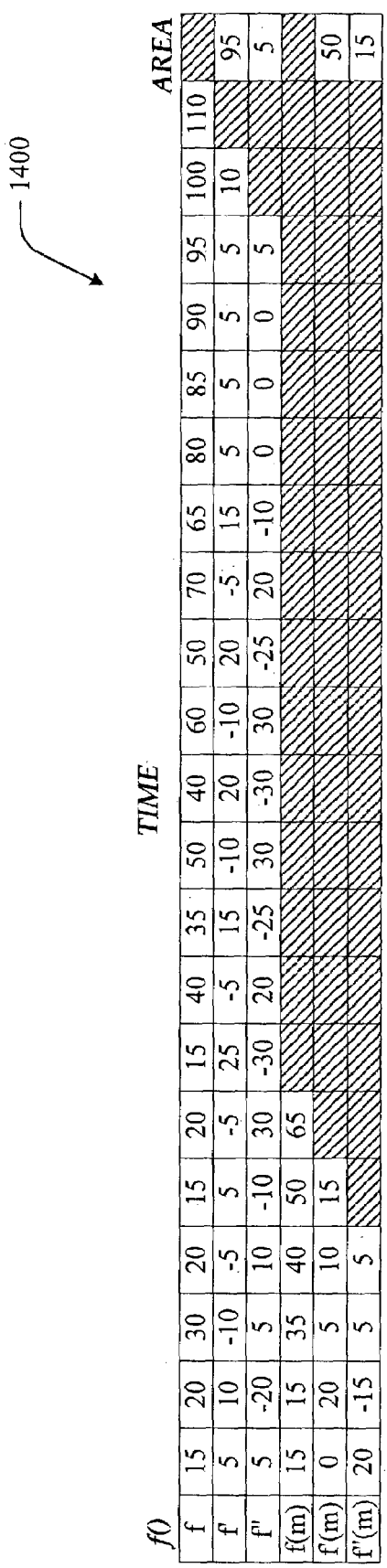
FIGS. 14–17 are tables that form the basis of the FIGS. 7–10 graphs.

Leak detection routine 200 begins at block 201 and proceeds to looping block 210, where an iteration through each memory usage record begins. Next, at block 300, 400 the usage data elements of the current usage record are optionally weighted and/or filtered. Those of ordinary skill in the art and others will appreciate that memory usage data may vary wildly over short periods of time. As a result, detecting usage data trends can benefit by weighting usage data elements in some manner. An exemplary memory usage record 1400 is illustrated in FIG. 14, and described below. Exemplary usage weighting subroutines 300 and 400 are illustrated in FIGS. 3 and 4, respectively, and described below.

Figure 5:
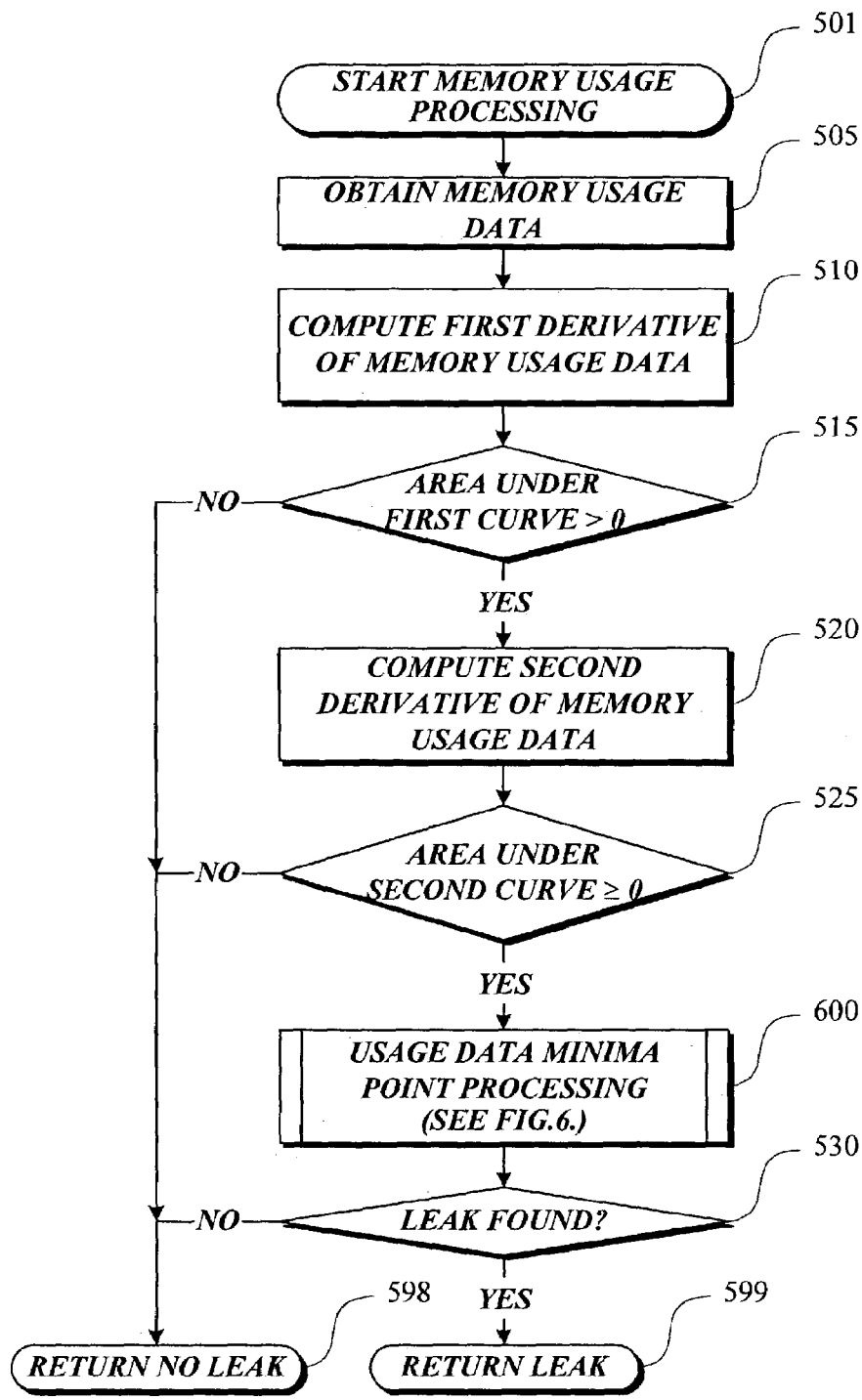
FIG. 5 is a functional flow diagram illustrating a memory usage processing subroutine suitable for use in FIG. 2.

Next, in block 500, the unweighted or optionally weighted memory usage data is processed to determine if the current memory usage record is leaking. A suitable memory usage processing subroutine 500 is illustrated in FIG. 5 and described below. After the memory usage processing subroutine 500 returns, processing proceeds to decision block 215 where a determination is made whether the pass through memory usage processing subroutine detected a leak. If a leak was detected, processing proceeds to block 220 where the details of the memory leak are stored. Such details may include the memory usage data, the origin of the leak (program, thread, or process) that corresponds to the memory usage record, the severity of the memory leak, etc. Processing then proceeds to loop back block 225 and cycles back to looping block 210. If (in decision block 215) it was found that the pass through the memory usage processing subroutine did not detect a leak, processing proceeds directly to loop back block 225 and cycles back to looping block 210, processing until all memory usage records have been iterated through. After all memory usage records have been iterated through, processing proceeds from loop back block 225 to block 299 where the leak detection routine 200 ends.

Memory usage records contain information regarding how much memory was allocated to a particular program, thread or process at a specific point in time. The amount of memory allocated to some programs both at initialization and later in response to subsequent events may rapidly change from time to time. These rapid fluctuations in memory usage may give a false indication of a memory leak or lack of a memory leak. This undesirable result can be minimized by weighting memory usage record data. A variety of conventional weighting techniques can be used, two of which are illustrated in FIGS. 3 and 4. The illustrated weighting should be taken as exemplary and not limiting. That is, the illustrated weighting techniques are not meant to limit in any fashion the weighting techniques used in any specific implementation of the present invention. In this regard, as noted above, the inclusion of a weighting technique should be considered optional since the inclusion of a weighting technique may not be needed or may be undesirable in some actual implementations of the invention.

Figure 3:
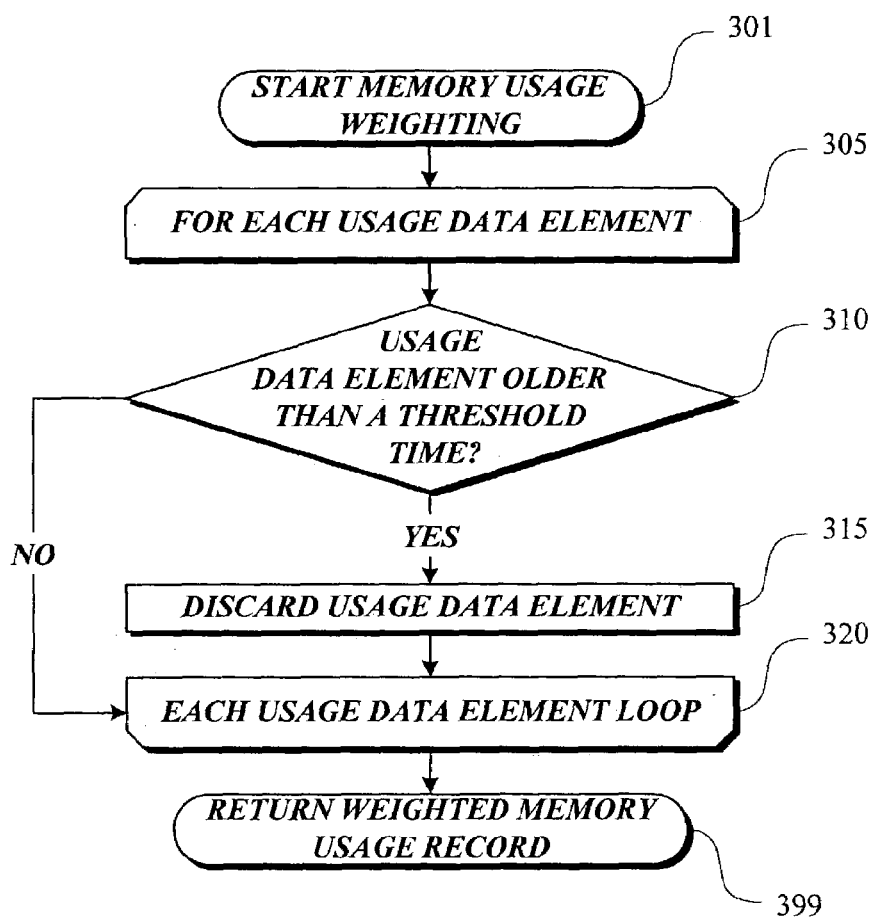
FIG. 3 is a functional flow diagram illustrating an exemplary memory usage weighting subroutine suitable for use in FIG. 2.
Figure 4:
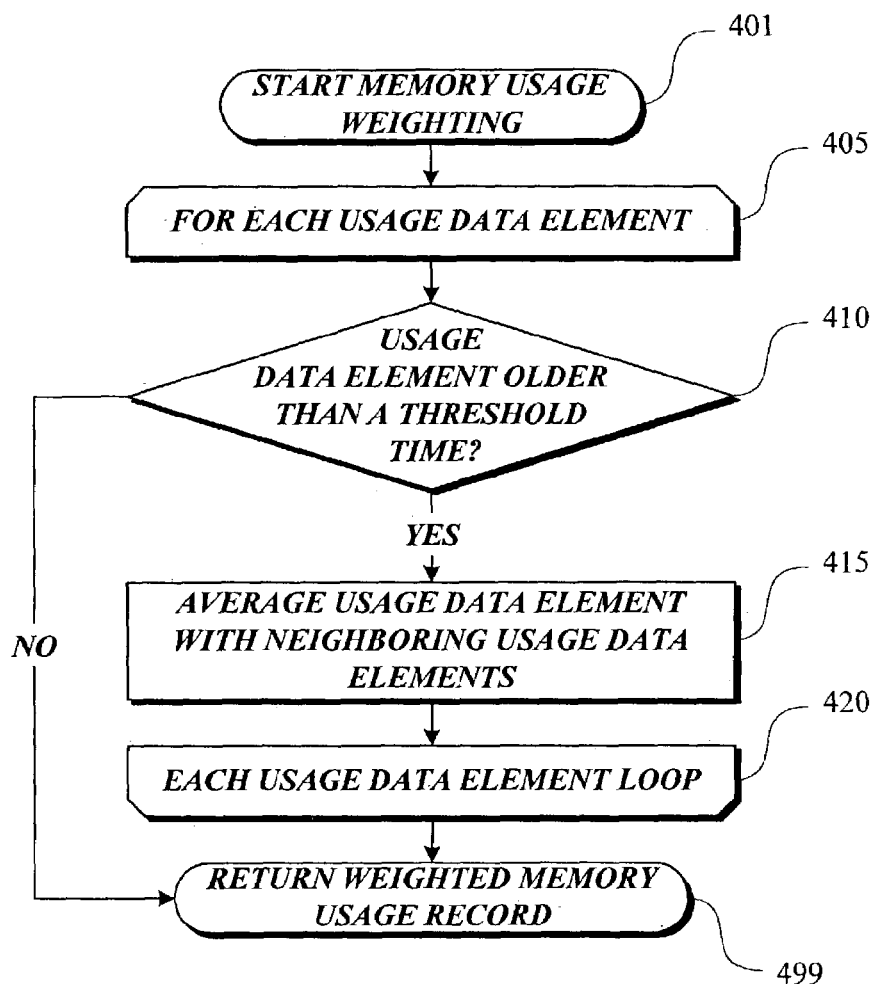
FIG. 4 is a functional flow diagram illustrating an alternative exemplary memory usage weighting subroutine suitable for use in FIG. 2.

FIG. 3 illustrates an exemplary cutoff weighting subroutine 300 that simply discards old memory usage elements. Memory usage weighting subroutine 300 begins at block 301 and proceeds to looping block 305 where an iteration through each usage data element begins. The first step in the loop is decision block 310 where a determination is made whether the current usage data element is older than a threshold time. In exemplary embodiment the threshold time is arbitrary and depends upon the nature of the leak to be detected. For example, on a server computer we may need to observe the memory usage over several months then the threshold would be very high to include months of data. For a computing device on which leaks can happen more frequently, a game console for example, we may need only a few hours worth of data and thus the threshold would be low. If the current usage data element is older than the threshold time, processing proceeds to block 315 where the usage data element is discarded, i.e., set to zero. Processing then proceeds to loop back block 320. Alternatively, if in decision block 310 the usage data element is determined to be not older than the threshold time, processing proceeds directly to loop back block 320. At loop back block 320 processing cycles back to looping block 305 unless all data elements have been iterated through. If all data elements have been iterated through, processing continues to block 399 where the weighting subroutine 300 ends, and returns to the calling FIG. 4 illustrates alternative exemplary weighting subroutine 400 that reduces the effect of old memory elements rather than discarding them. Memory usage weighting subroutine 400 begins at block 401 and proceeds to looping block 405 where an iteration through each usage data element begins, starting from the oldest element. The first in the loop is decision block 410 where a determination is made whether the current usage data element is older than a threshold time. If the current usage data element is older than the threshold time, processing proceeds to block 415 where the impact of the usage data elements are reduced by averaging the magnitude of the current data element with its neighboring data elements. Beginning and ending data elements are counted twice and averaged with their immediate upstream and downstream neighbor so as to provide a smoother attenuation. Processing then proceeds to loop back block 420. At loop back block 420 processing cycles back to looping block 405, unless all data elements have been iterated through. If all data elements have been iterated through, processing proceeds to block 499 where the weighting subroutine 400 ends and returns to the calling routine.

Alternatively, if in decision block 410 the usage data element is determined to be not older than the threshold time, processing terminates the loop and proceeds directly to block 499.

FIG. 5 illustrates an exemplary memory usage processing subroutine 500 suitable for processing a memory usage record to determine if the memory usage record data indicates a memory leak. The illustrated memory usage processing subroutine 500 begins at block 501 and proceeds to block 505 where memory usage data is obtained from a memory usage record. Table 1400 (illustrated in FIG. 14) and the corresponding graph 710 shown in FIG. 7 (described below) are exemplary illustrations of the type of memory usage data obtained at block 505. More specifically, the "f" line of Table 1400 is memory usage data taken at some points in time.

Next, in block 510, the first derivative of the memory usage data is computed. The result of the first derivative computation is set forth in the f' line of Table 1400 and plotted as a first curve 1110 in FIG. 11, which is described more fully below. A suitable method of computing the first derivative of the memory usage data is to subtract the value of the current memory usage data element from the value of the next memory usage data element for all memory usage data elements. The f' line in Table 1400 sets forth the values obtained using this method of determining the first derivative of the memory usage values in line f of Table 1400.

While this method is preferred, other more computationally complex methods can be used if desired.

Next, in decision block 515, a determination is made whether the area under the curve produced by plotting the first derivation data points (curve 1110, FIG. 11) is greater than zero. An acceptable method of calculating the area under the curve is summing all the values of all of the data elements determined by the first derivative calculation, i.e. the value of all of the elements in line f line of Table 1400.

If, in decision block 515, it is determined that the area under the first derivative curve is greater than zero, processing proceeds to block 520. If, however, in decision block 515, it is determined that the area under the first derivative curve is not greater than zero, processing proceeds to block 598 where subroutine 500 ends and returns to its calling routine along with an indication that no memory leak was indicated by the memory usage data.

Figure 12:
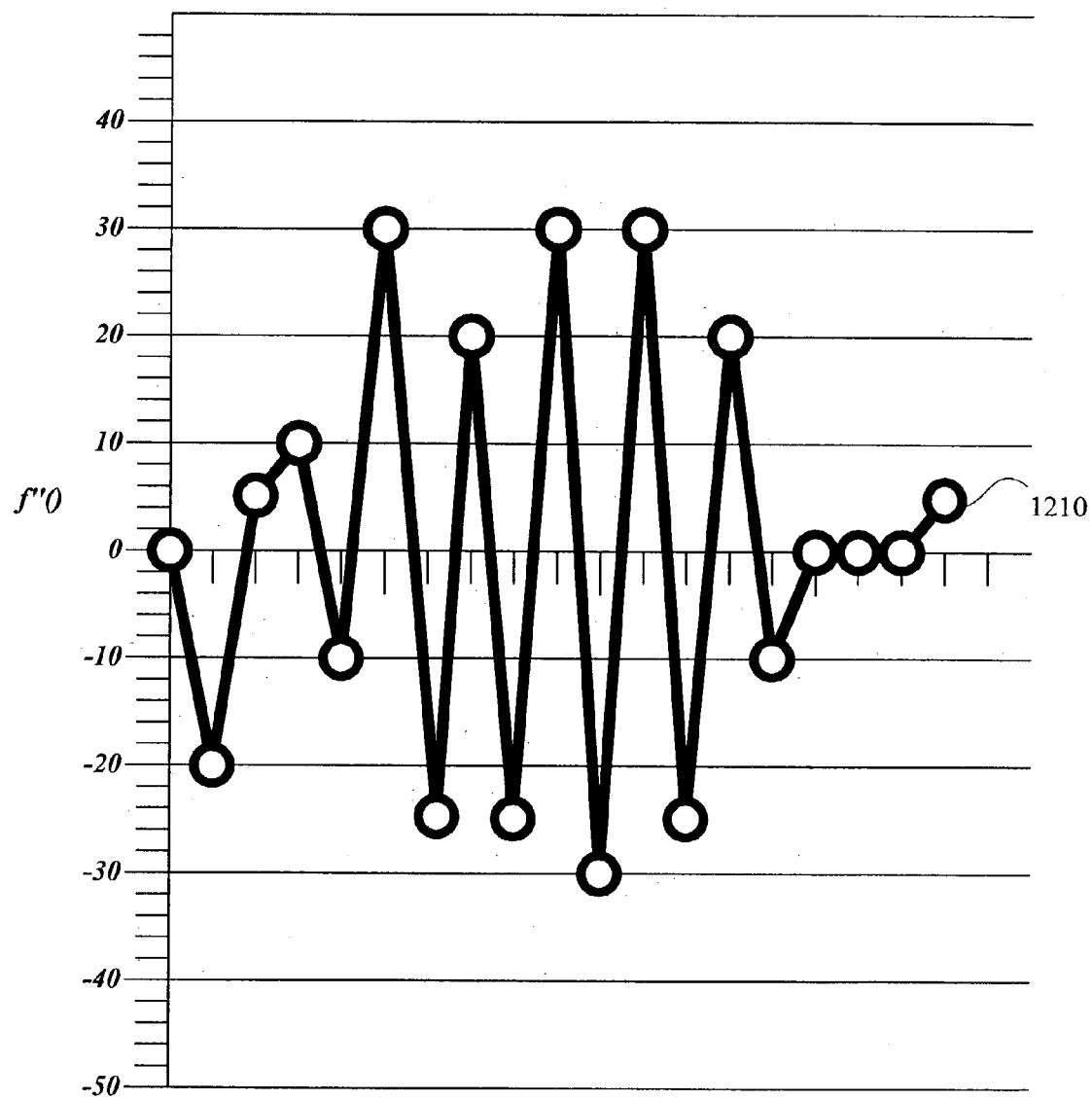

At block 520, the second derivative of the memory usage data is computed. Like the first derivative calculation, an acceptable way of determining the second derivative is subtracting the value of the current first derivative element from the value of the next first derivative element. This is how in Table 1400 the elements of the second derivative line, i.e. the f" line, are obtained. FIG. 12 illustrates a second derivative curve 1210 created by plotting the f" line values. Those of ordinary skill in the art and other will appreciate that other more computationally complex methods can also be used.

Figure 6:
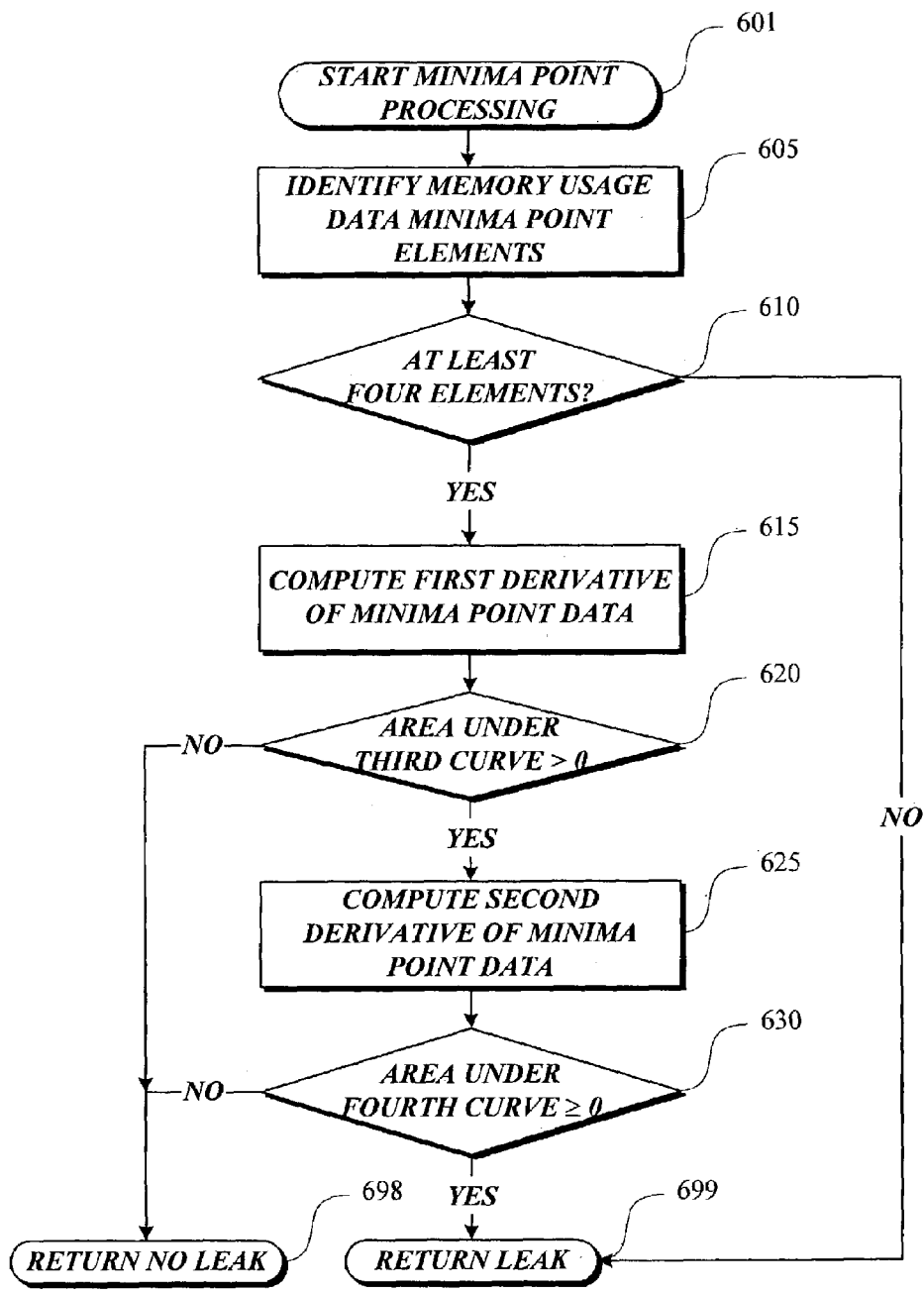
FIG. 6 is a functional flow diagram illustrating a memory usage data minima point processing subroutine suitable for use in FIG. 5.

Next, in decision block 525, a determination is made whether the area under the second derivative curve, i.e. curve 1210 in FIG. 12, is greater than or equal to zero. Again, an acceptable way of calculating this area value is by summing the values of all the second derivative data elements, i.e. all of the elements of line f" of Table 1400. If the area under the second derivative curve 1210 is determined to be not greater than or equal to zero, processing proceeds to block 598 where the memory usage processing subroutine ends and a no leak message is sent to the calling routine. If, however, it is determined that the area under the second derivative curve is greater than or equal to zero, processing proceeds to subroutine block 600 where the memory usage data minima points are processed to determine if there is a memory leak. A suitable minima point processing subroutine 600 is illustrated in FIG. 6 and described below. After subroutine 600 returns, in decision block 530, a determination is made whether minima point processing subroutine 600 returned an indication of a memory leak. If a memory leak was found, processing proceeds to block 599 where the memory usage processing subroutine 500 ends and a memory leak message is returned to the calling routine. If, however, in decision block 530 it is determined that the usage data minima point processing subroutine 600 found no memory leak, processing proceeds to block 598 where the memory usage processing subroutine 500 ends and a no leak message is returned to the calling routine.

FIG. 6 illustrates an exemplary memory usage data minima point processing subroutine 600 suitable for use in FIG. 5. The minima point processing subroutine 600 analyzes the minima points of the memory usage data of a particular memory usage record to determine if the minima points do or do not indicate a memory leak in conjunction with the previous determination that the area under first and second derivative curves exceeds zero.

Figure 13A:
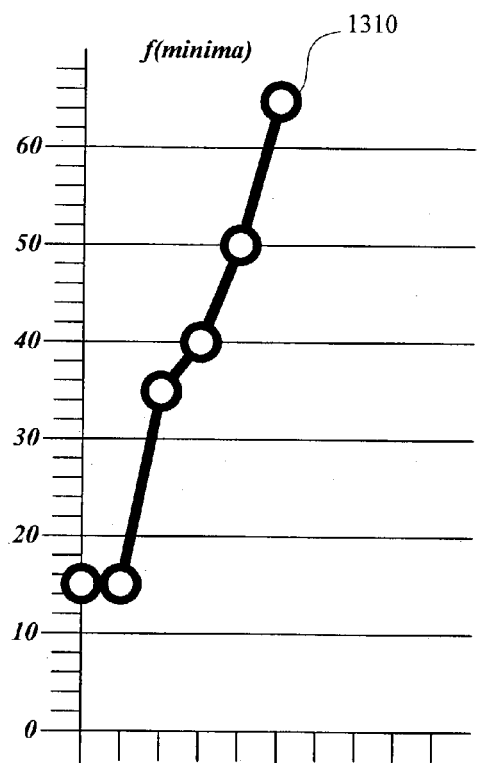

The minima point processing subroutine 600 begins at block 601 and proceeds to block 605 where the minima points of the memory usage data are identified. (FIG. 13a illustrates an exemplary graph 1310 of the minima points) for the memory usage data graphically illustrated in FIG. 7. The minima points are those points in the memory usage data elements after which the curve produced by a graph of the data elements changes from downward to upward. Looking to FIG. 7, the minima points 705 of curve 710 are readily apparent.

Next, subroutine 600 proceeds to decision block 610 where a test is made to determine whether at least four memory usage data minima point were found. If less than four memory usage data minima points were found, processing proceeds to block 699, where subroutine 600 ends and a memory leak message is returned to the calling routine.

If, in decision block 610, it was determined that at least four elements were found, more processing is needed. Those of ordinary skill in the art and others will appreciate that minima points can occur at irregular intervals, thereby causing missing data between minima points. These data points may be interpolated linearly; however, these data points are inconsequential to the final area under curve computation. Accordingly, the interpolation/fill-in step can be eliminated.

Figure 13B:
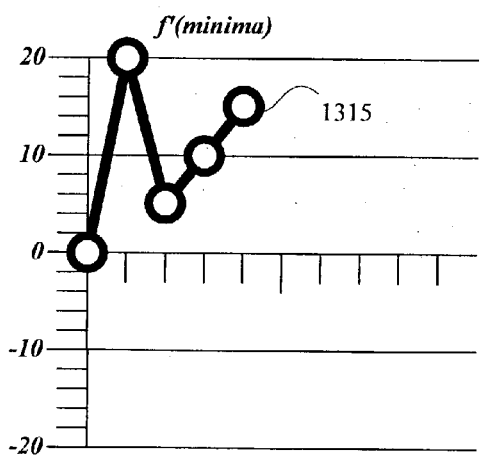

If four minima points were found, subroutine 600 proceeds to block 615 where the first derivative of the identified memory usage data minima points is computed. Again, an acceptable way of obtaining first derivative data points is to subtract the value of the current memory usage data minima points from the value of the next memory usage data minima points. The resulting first derivative data points can be used to plot a first derivative curve 1315 of the type shown in FIG. 13b. Next, in decision block 620, a determination is made whether the area under this first derivative curve is greater than zero. If the area under the first derivative curve is not greater than zero, processing proceeds to block 698 where subroutine 600 ends and a no memory leak message is returned to the calling routine.

Figure 13C:
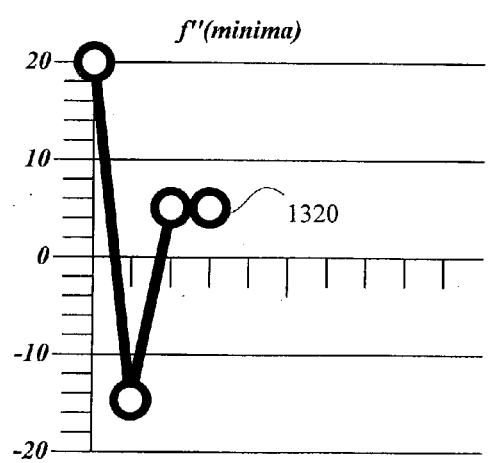

If, however, in decision block 620, a determination was made that the area under the first derivative curve is greater than zero, processing proceeds to block 625 where the second derivative of the memory usage data minima points is computed. Again, an acceptable way of determining second derivative data points is to subtract the value of the current first derivative element from the value of the next derivative element. The resulting second derivative data points can be used to plot a second derivative curve, such as the curve 1320 shown in FIG. 13c. Next, in decision block 630, a determination is made whether the area under this second derivative curve is greater than or equal to zero. If the area under the second derivative curve is greater than or equal to zero, processing proceeds to block 699 where subroutine 600 ends and a leak message is returned to the calling routine, as described above. If the area under the second derivative curve is not greater than or equal to zero, processing proceeds to block 698 where the subroutine 600 also ends and a no leak message is returned to the calling routine.

Figure 7:
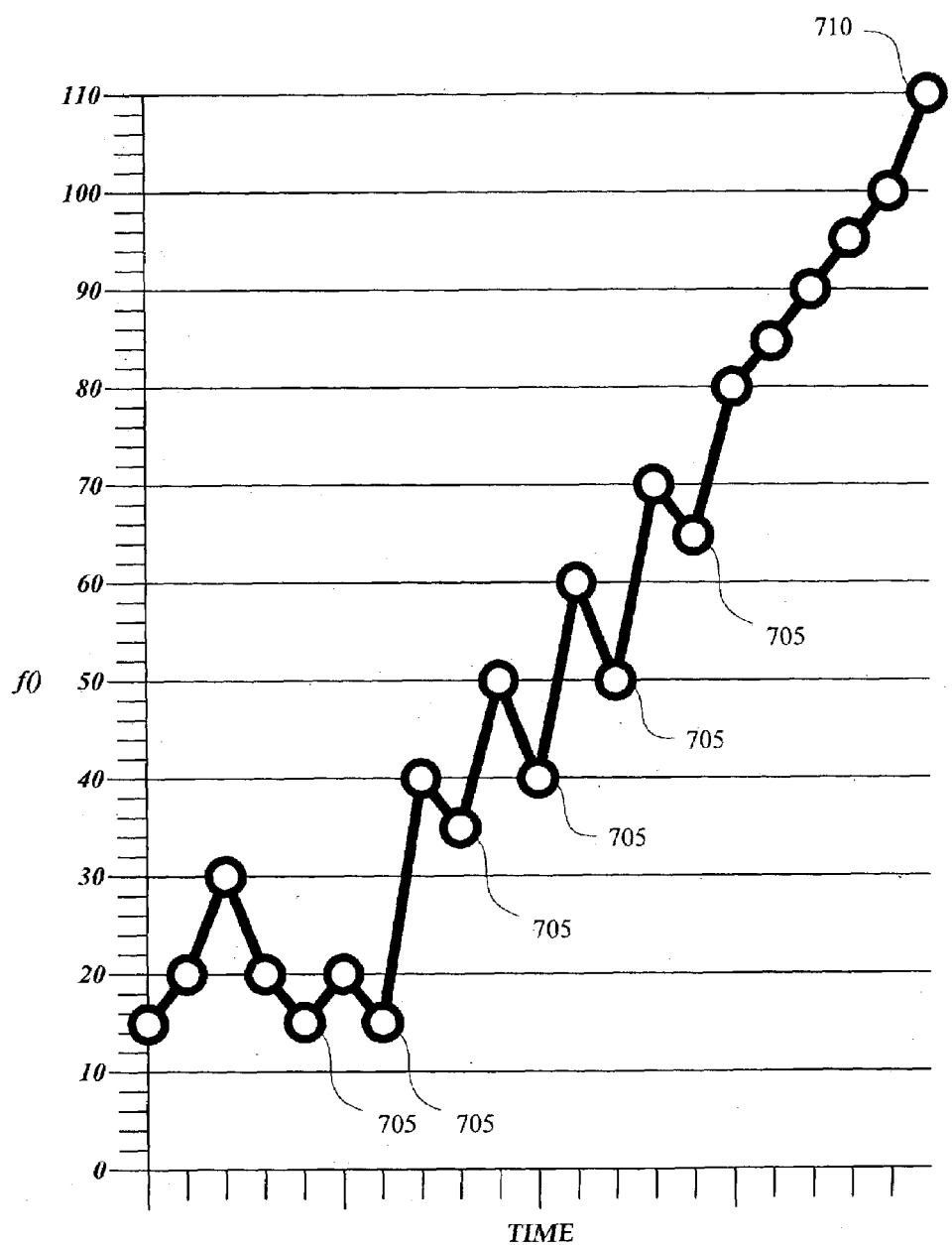
FIGS. 7–10 are example graph diagrams of memory usage data.
Figure 8:
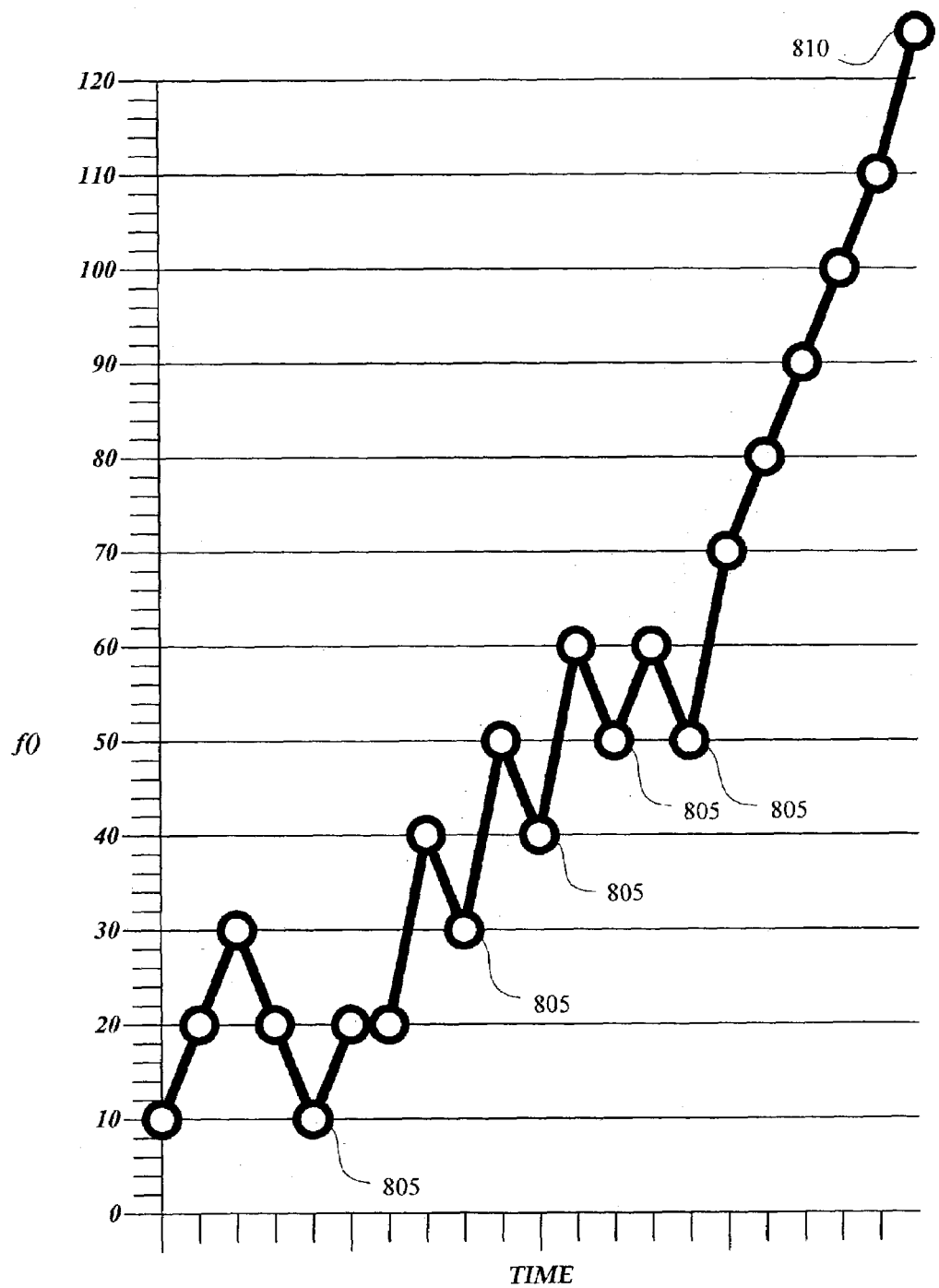
Figure 9:
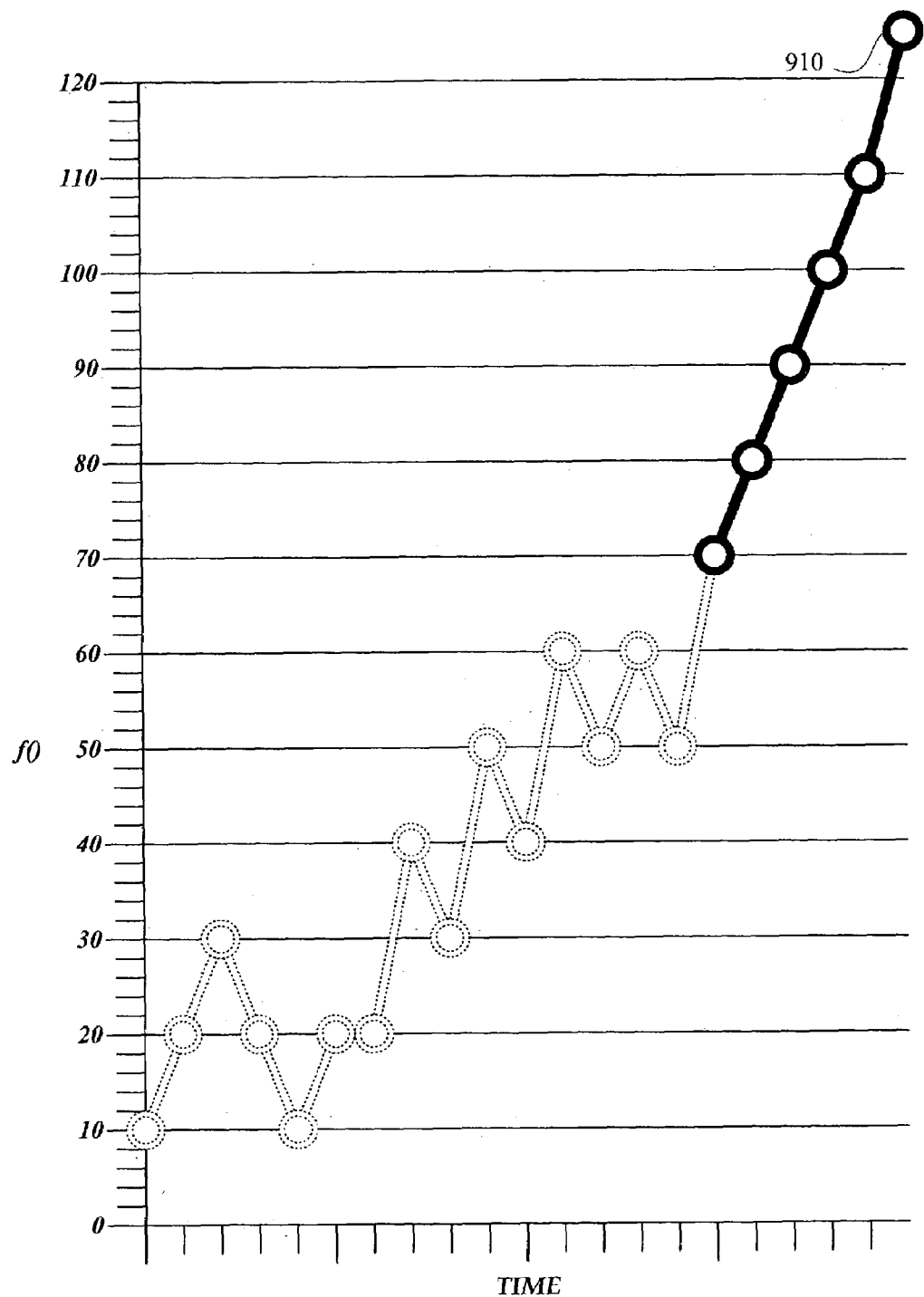
Figure 10:
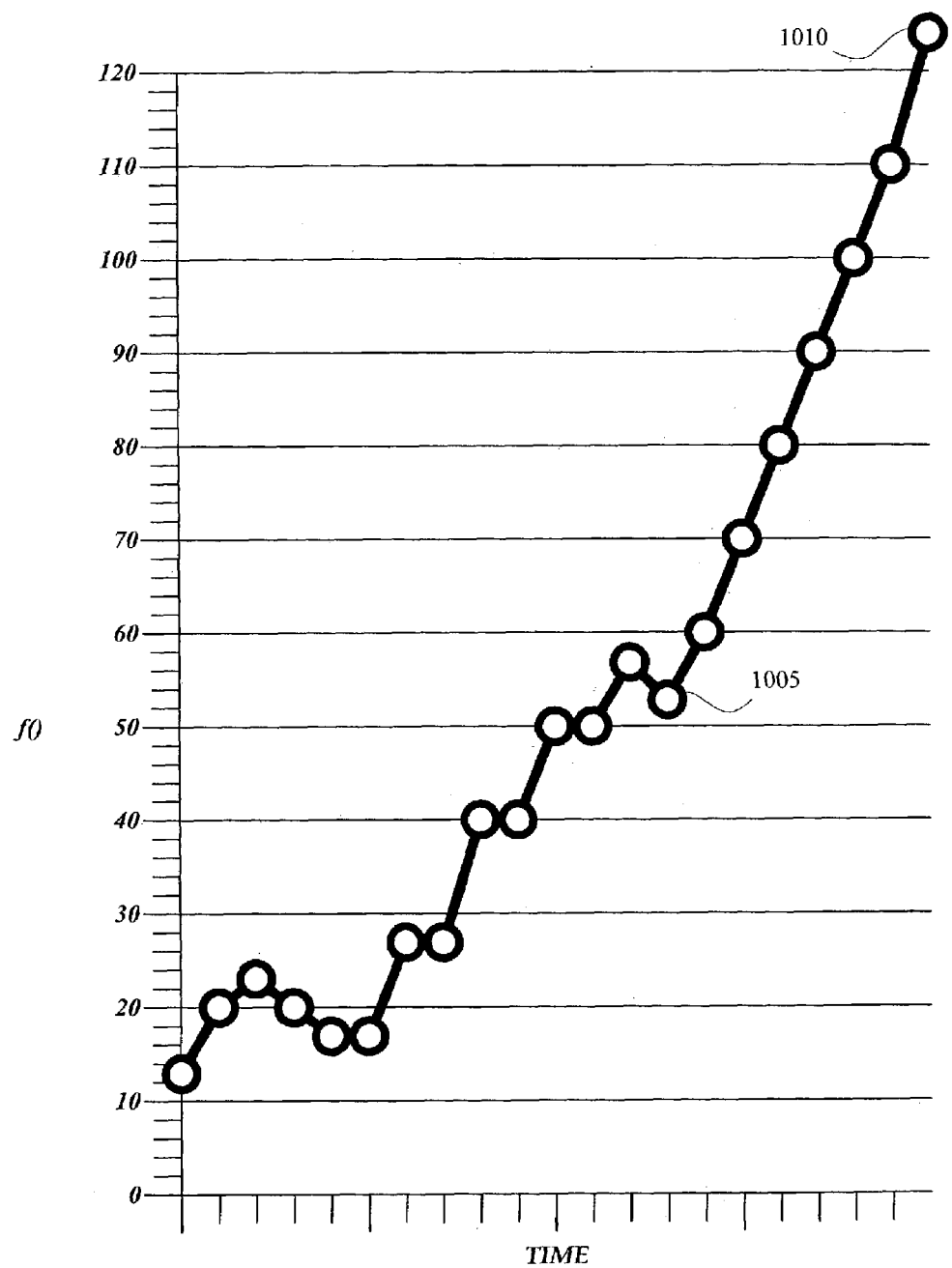
Figure 15:
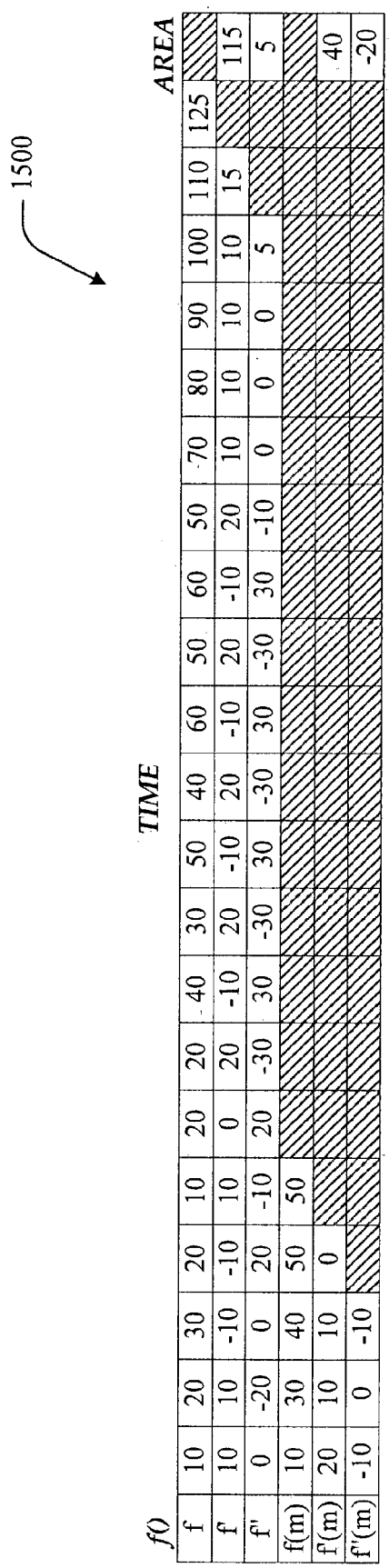
Figure 16:
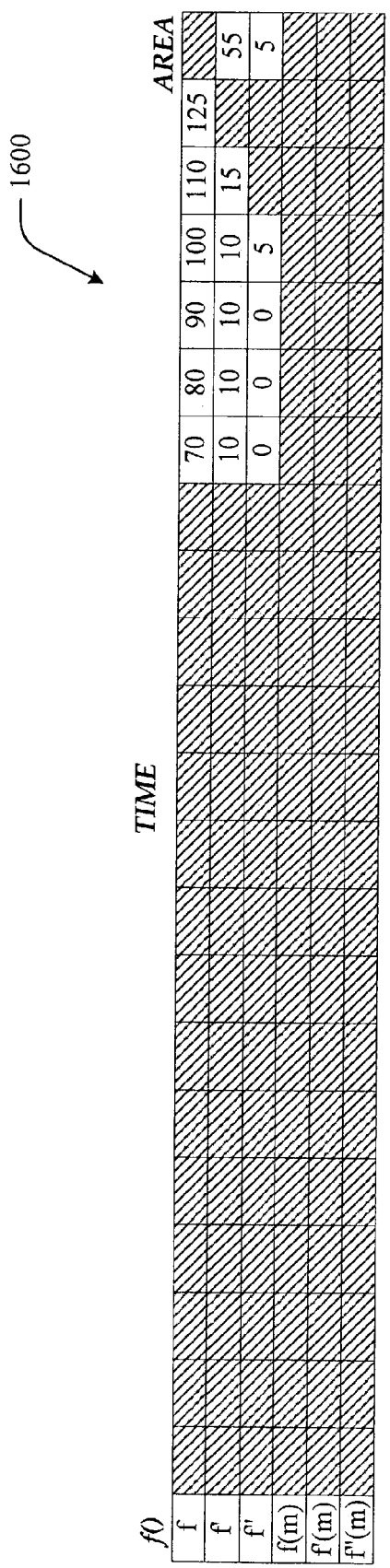
Figure 17:
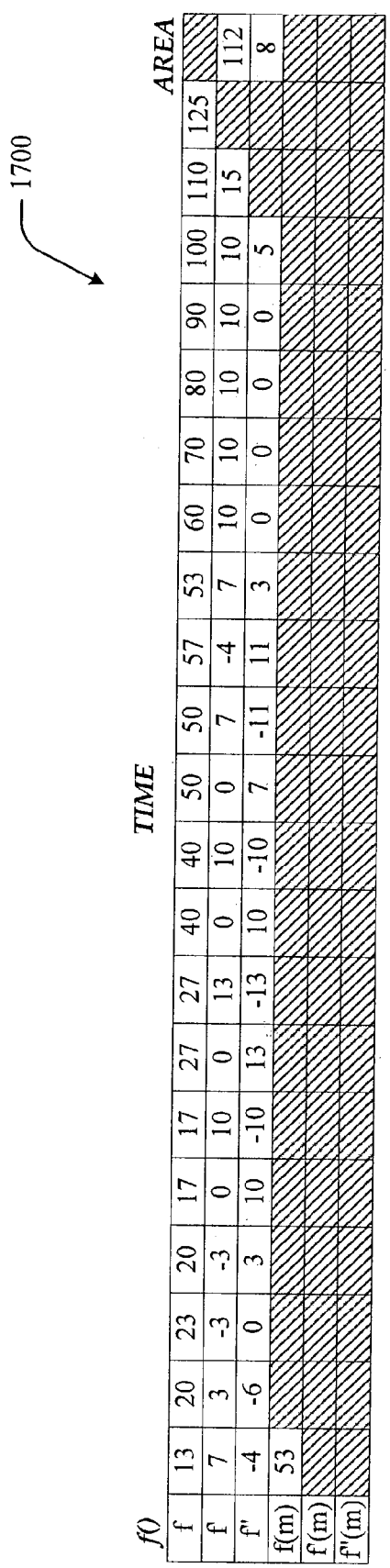

As noted above, FIG. 7 is a plot or graph of memory usage data elements for an exemplary memory usage record. FIG. 7 is a graph or plot of the memory usage values shown in line f of Table 1400. FIGS. 11–13c are plots or graphs of the calculated values occurring on lines f', f", f(m), f'(m), and f"(m) of Table 1400, respectively. FIGS. 8–10 are plots or graphs of line f of Tables 1500, 1600, and 1700, FIGS. 15–17, respectively, for the memory usage data elements of different exemplary memory usage records.

Figure 11:
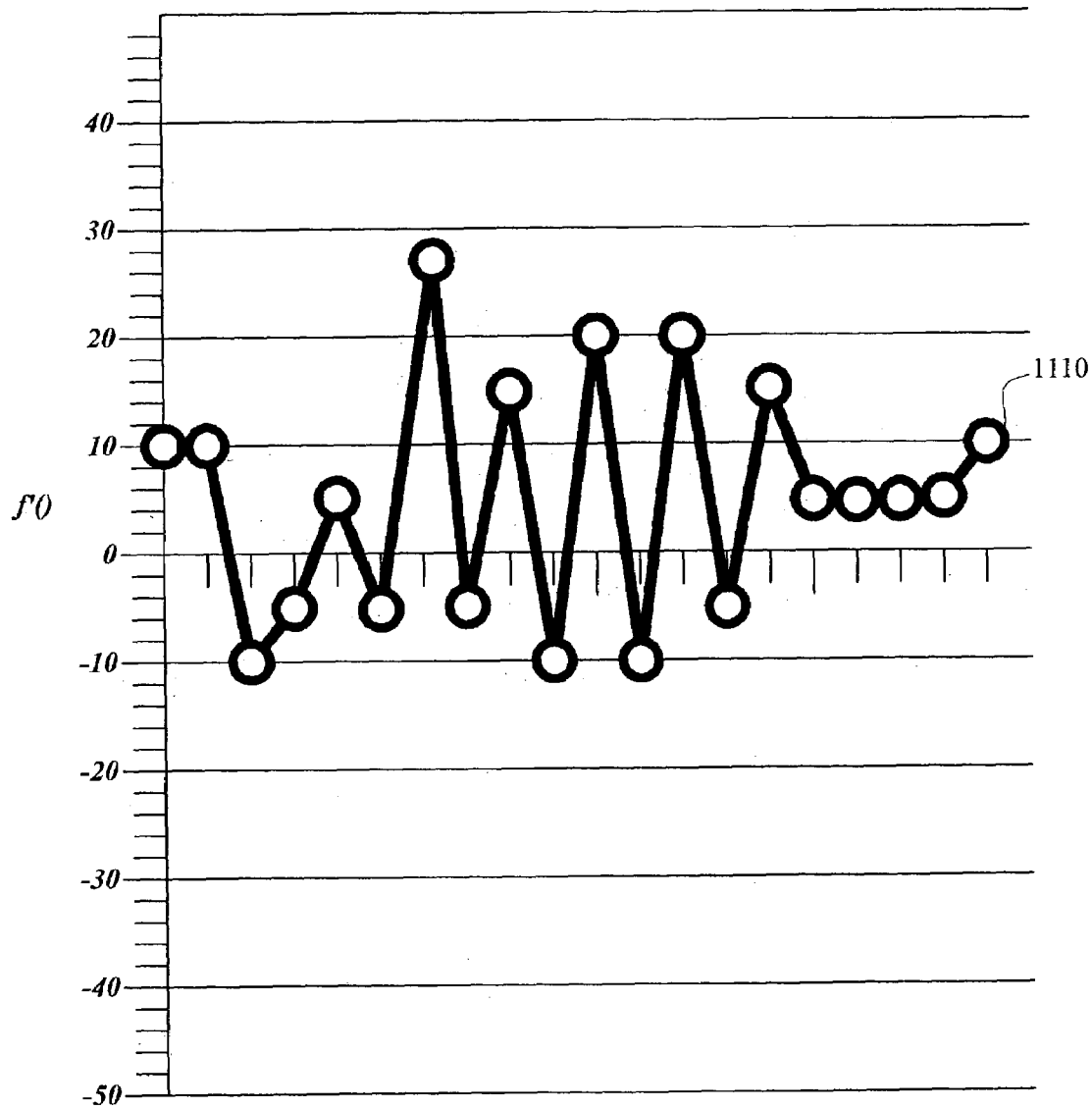
FIGS. 11–13c are example graph diagrams of processed memory usage data.

Applying the inventive methods illustrated in routine 200 and its subroutines to the first derivative exemplary data of Table 1400 (line f'), as graphed or plotted in FIG. 11, establishes that the sum of first derivative values, which represents the area under the first derivative curve, is one hundred. Since one hundred is greater than zero, in this example, processing proceeds to computing the second derivative. This computation produces the values in line f" of Table 1400 that, when summed, have a value of five. This value requires that minima point processing (FIG. 6) take place. Since there are four or more minima points, the first derivative of the memory usage data minima points is calculated (line f'(m), Table 1400) and the value of the resulting data points, which represents the area under the resulting curve, are summed. Since the sum of the values of the first derivative data points is fifty, which is greater than zero, processing proceeds to computing the second derivative. The sum of the second derivative data points is fifteen (area under a curve plotted using the data points of line f"(m) of Table 1400). As all value sums are greater than zero, a leak message is returned.

Table 1500 (illustrated in FIG. 15 and graphed in FIG. 8) illustrates a different scenario. The sums of the values of the data points of the first and second derivatives of the memory usage data elements of Table 1500, i.e., the sums of lines f' and f", are both greater than zero (one hundred and five respectively). However, the sum of the values of the data points of the second derivative of the memory usage data minima points is a negative twenty. As a result, a no leak message is returned to the calling routine. Table 1500 illustrates memory usage values that might lead to a false indication of a memory leak if minima point data is not taken into consideration.

While Table 1500 illustrates a scenario in which minima point data indicates no memory leak, it is possible that minima point processing may give rise to false negative indications of memory leaks under certain circumstances. One such circumstance is when old memory usage data minima points do not indicate a memory leak, but more recent memory usage data indicates a memory leak. This undesirable result can be minimized by weighting memory usage data so as to place more emphasis on recent data, as described above with respect to FIGS. 3 and 4.

Table 1600 (illustrated in FIG. 16 and graphed in FIG. 9) illustrates the same memory usage data as Table 1500, that has been weighted in accordance with weighting subroutine 300 (discarding old memory usage values). In contrast to the Table 1500 data, the Table 1600 data indicates a memory leak. Both the first and second derivatives of the memory usage data have sums greater than zero and there are less than four minima points. Accordingly, the subroutines 500 and 600 would return a memory leak message. The graph 910 (FIG. 9) of the memory usage data illustrates a clear upward trend in memory usage, which is indicative of a memory leak.

Table 1700 (illustrated in FIG. 17 and graphed in FIG. 10) is similar to Table 1600, in that it too illustrates the data of Table 1500, but in Table 1700 the memory usage data have been enhanced using the subroutine 400 illustrated in FIG. 4. The processing of memory usage data now returns a memory leak message. Comparing the graph 1010 of the memory usage data from Table 1700 with the graph 810 of the memory usage data from Table 1500, it is apparent that the older data minima points are less pronounced. Accordingly the graph 1010 better reveals an upward trend, which is indicative of a memory leak.

While the preferred embodiment of the invention has been illustrated and described, it will be appreciated that various changes can be made therein without departing from the spirit and scope of the invention. For example, all of the memory usage data elements can be enhanced using the subroutine shown in FIG. 4 Table 1700 instead of only older memory usage data elements. Hence, within the scope of the appended claims, it is to be understood that the invention can be produced otherwise than as specifically described herein.

The embodiments of the invention in which an exclusive property or privilege is claimed are defined as follows:

1. A method of detecting a leak in a computer memory, comprising:
    obtaining memory usage data for a memory using component;
    computing the first derivative of the memory usage data;
    determining if the area under a curve based on said first derivative of the memory usage data is greater than a predetermined value;
    if the area under a curve based on said first derivative of the memory usage data is greater than said first predetermined value, computing the second derivative of the memory usage data;
    determining if the area under a curve based on said second derivative of the memory usage data is greater than or equal to a second predetermined value;
    if the area under a curve based on said second derivative of the memory usage data is greater than or equal to said second predetermined value, determining the number of minima points in said usage data; and
    indicating a memory leak if said number of minima points in said usage data is less than a third predetermined value.

2. The method of claim 1, wherein said first and second predetermined values are the same.

3. The method of claim 2, wherein said first and second predetermined values are zero.

4. The method of claim 1, wherein said first predetermined value is zero.

5. The method of claim 1, wherein said second predetermined value is zero.

6. The method of claim 1, wherein said third predetermined value is four.

7. The method of claim 1, wherein if the area under the curve of the first derivative of the memory usage data is not greater than said first predetermined value, indicating that no memory leak is present.

8. The method of claim 1, wherein if the area under the curve of the second derivative of the memory usage data is not greater than or equal to said second predetermined value, indicating that no memory leak is present.

9. The method of claim 1, further comprising if said number of minima points is greater than said third predetermined number;
    calculating the first derivative of said memory usage data minima points;
    determining if the area under a curve based on said first derivative of the memory usage data minima points is greater than a fourth predetermined value;
    if the area under a curve based on said first derivative of the memory usage data minima points is greater than said fourth predetermined value, calculating the second derivative of the memory usage data minima points;
    determining if the area under a curve based on said second derivative of the memory usage data minima points is greater than or equal to a fifth predetermined value; and
    indicating a memory leak if the area under a curve based on said second derivative of the memory usage data minima points is greater than or equal to said fifth predetermined value.

10. The method of claim 1, wherein if the area under the curve of the first derivative of the memory usage data minima points is not greater than said first predetermined value, indicating that no memory leak is present.

11. The method of claim 1, wherein if the area under the curve of the second derivative of the memory usage data minima points is not greater than or equal to said second predetermined value, indicating that no memory leak is present.

12. The method of claim 1, wherein identifying the severity of a memory leak is determined by the magnitude of the area under a curve based on said second derivative of the memory usage data.

13. The method of claim 12, wherein the memory usage data of a plurality of memory using components are sequentially obtained.

14. The method of claim 1, further comprising weighting said memory usage data.

15. The method of claim 14, wherein said memory usage data comprises usage data elements and wherein weighting said memory usage data comprises decreasing the significance of usage data elements older than a threshold time ("older data elements").

16. The method of claim 15, wherein decreasing the significance of said older data elements comprises discarding said usage data elements.

17. The method of claim 16, wherein decreasing the significance of said older usage data elements comprises reducing the value of said older usage data elements vis-à-vis the value of usage data elements not older than said threshold time.

18. The method of claim 16, wherein reducing the value of said older data elements comprises averaging each older data element with its immediate neighboring data elements.

19. A computer readable medium containing computer executable instructions for detecting a memory leak by:
   obtaining memory usage data for a memory using component;
   computing the first derivative of the memory usage data;
   determining if the area under a curve based on said first derivative of the memory usage data is greater than a predetermined value;
   if the area under a curve based on said first derivative of the memory usage data is greater than said first predetermined value, computing the second derivative of the memory usage data;
   determining if the area under a curve based on said second derivative of the memory usage data is greater than or equal to a second predetermined value;
   if the area under a curve based on said second derivative of the memory usage data is greater than or equal to said second predetermined value, determining the number of minima points in said usage data; and
   indicating a memory leak if said number of minima points in said usage data is less than a third predetermined value.

20. The computer readable medium of claim 19, wherein said first and second predetermined values are the same.

21. The computer readable medium of claim 20, wherein said first and second predetermined values are zero.

22. The computer readable medium of claim 19, wherein said first predetermined value is zero.

23. The computer readable medium of claim 19, wherein said second predetermined value is zero.

24. The computer readable medium of claim 19, wherein said third predetermined value is four.

25. The computer readable medium of claim 19, wherein if the area under the curve of the first derivative of the memory usage data is not greater than said first predetermined value, indicating that no memory leak is present.

26. The computer readable medium of claim 19, wherein if the area under the curve of the second derivative of the memory usage data is not greater than or equal to said second predetermined value, indicating that no memory leak is present.

27. The computer readable medium of claim 19, further comprising if said number of minima points is greater than said third predetermined number;
   calculating the first derivative of said memory usage data minima points;
   determining if the area under a curve based on said first derivative of the memory usage data minima points is greater than a fourth predetermined value;
   if the area under a curve based on said first derivative of the memory usage data minima points is greater than said fourth predetermined value, calculating the second derivative of the memory usage data minima points;
   determining if the area under a curve based on said second derivative of the memory usage data minima points is greater than or equal to a fifth predetermined value; and
   indicating a memory leak if the area under a curve based on said second derivative of the memory usage data minima points is greater than or equal to said fifth predetermined value.

28. The computer readable medium of claim 19, wherein if the area under the curve of the first derivative of the memory usage data minima points is not greater than said first predetermined value, indicating that no memory leak is present.

29. The computer readable medium of claim 19, wherein if the area under the curve of the second derivative of the memory usage data minima points is not greater than or equal to said second predetermined value, indicating that no memory leak is present.

30. The computer readable medium of claim 19, wherein identifying the severity of a memory leak is determined by the magnitude of the area under a curve based on said second derivative of the memory usage data.

31. The computer readable medium of claim 30, wherein the memory usage data of a plurality of memory using components are sequentially obtained.

32. The computer readable medium of claim 19, further comprising weighting said memory usage data.

33. The computer readable medium of claim 32, wherein said memory usage data comprises usage data elements and wherein weighting said memory usage data comprises decreasing the significance of usage data elements older than a threshold time ("older data elements").

34. The computer readable medium of claim 33, wherein decreasing the significance of said older data elements comprises discarding said usage data elements.

35. The computer readable medium of claim 34, wherein decreasing the significance of said older usage data elements comprises reducing the value of said older usage data elements vis-à-vis the value of usage data elements not older than said threshold time.

36. The computer readable medium of claim 34, wherein reducing the value of said older data elements comprises averaging each older data element with its immediate neighboring data elements.

37. A computing apparatus having a processor and a memory containing computer executable instructions, the processor operative to execute the executable instructions from memory to:
  obtain memory usage data for a memory using component;
  compute the first derivative of the memory usage data;
  determine if the area under a curve based on said first derivative of the memory usage data is greater than a predetermined value;
  if the area under a curve based on said first derivative of the memory usage data is greater than said first predetermined value, compute the second derivative of the memory usage data;
  determine if the area under a curve based on said second derivative of the memory usage data is greater than or equal to a second predetermined value;
  if the area under a curve based on said second derivative of the memory usage data is greater than or equal to said second predetermined value, determine the number of minima points in said usage data; and
  indicate a memory leak if said number of minima points in said usage data is less than a third predetermined value.

38. The computing apparatus of claim 37, wherein said first and second predetermined values are the same.

39. The computing apparatus of claim 38, wherein said first and second predetermined values are zero.

40. The computing apparatus of claim 37, wherein said first predetermined value is zero.

41. The computing apparatus of claim 37, wherein said second predetermined value is zero.

42. The computing apparatus of claim 37, wherein said third predetermined value is four.

43. The computing apparatus of claim 37, which if the area under the curve of the first derivative of the memory usage data is not greater than said first predetermined value, indicates that no memory leak is present.

44. The computing apparatus of claim 37, which if the area under the curve of the second derivative of the memory usage data is not greater than or equal to said second predetermined value, indicates that no memory leak is present.

45. The computing apparatus of claim 37, further comprising if said number of minima points is greater than said third predetermined number;
  calculates the first derivative of said memory usage data minima points;
  determines if the area under a curve based on said first derivative of the memory usage data minima points is greater than a fourth predetermined value;
  if the area under a curve based on said first derivative of the memory usage data minima points is greater than said fourth predetermined value, calculates the second derivative of the memory usage data minima points;
  determines if the area under a curve based on said second derivative of the memory usage data minima points is greater than or equal to a fifth predetermined value; and
  indicates a memory leak if the area under a curve based on said second derivative of the memory usage data minima points is greater than or equal to said fifth predetermined value.

46. The computing apparatus of claim 37, which if the area under the curve of the first derivative of the memory usage data minima points is not greater than said first predetermined value, indicates that no memory leak is present.

47. The computing apparatus of claim 37, which if the area under the curve of the second derivative of the memory usage data minima points is not greater than or equal to said second predetermined value, indicates that no memory leak is present.

48. The computing apparatus of claim 37, wherein identifying the severity of a memory leak is determined by the magnitude of the area under a curve based on said second derivative of the memory usage data.

49. The computing apparatus of claim 48, wherein the memory usage date of a plurality of memory using components are sequentially obtained.

50. The computing apparatus of claim 37, further comprising weighting said memory usage data.

51. The computing apparatus of claim 50, wherein said memory usage data comprises usage data elements and wherein weighting said memory usage data comprises decreasing the significance of usage data elements older than a threshold time ("older data elements").

52. The computing apparatus of claim 51, wherein decreasing the significance of said older data elements comprises discarding said usage data elements.

53. The computing apparatus of claim 52, wherein decreasing the significance of said older usage data elements comprises reducing the value of said older usage data elements vis-à-vis the value of usage data elements not older than said threshold time.

54. The computing apparatus of claim 52, wherein reducing the value of said older data elements comprises averaging each older data element with its immediate neighboring data elements.

* * * * *